(12) United States Patent
Michitarian et al.

(10) Patent No.: US 12,332,072 B2
(45) Date of Patent: Jun. 17, 2025

(54) VISUAL GUIDANCE SYSTEM FOR PARKING ASSISTANCE

(71) Applicant: Harman Becker Automotive Systems GmbH, Karlsbad (DE)

(72) Inventors: Artashes Michitarian, Oberschleissheim (DE); Andreas Koehnlechner, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 17/816,670

(22) Filed: Aug. 1, 2022

(65) Prior Publication Data

US 2023/0059075 A1 Feb. 23, 2023

(30) Foreign Application Priority Data

Aug. 17, 2021 (EP) .................................... 21191649

(51) Int. Cl.
*G01C 21/36* (2006.01)
*B60K 35/00* (2024.01)
*B60K 35/28* (2024.01)

(52) U.S. Cl.
CPC ..... *G01C 21/3632* (2013.01); *G01C 21/3635* (2013.01); *G01C 21/3647* (2013.01);
(Continued)

(58) Field of Classification Search
CPC ............ G01C 21/3632; G01C 21/3635; G01C 21/3647; G01C 21/3697; B60K 35/00; B60K 2370/161; B60K 2370/166; B60K 35/28; B60K 2360/161; B60K 2360/166; B60W 30/06; B60W 50/00; B62D 15/027;
(Continued)

(56) References Cited

U.S. PATENT DOCUMENTS

2004/0254720 A1* 12/2004 Tanaka ................. B62D 15/027
  701/36
2005/0027415 A1* 2/2005 Iwazaki ............. B62D 15/0285
  701/41

(Continued)

FOREIGN PATENT DOCUMENTS

DE  102014007796 A1  9/2015
JP     2001199298 A   7/2001

(Continued)

OTHER PUBLICATIONS

JP 2001-199298A English Translation (Year: 2001).*

(Continued)

*Primary Examiner* — Faris S Almatrahi
*Assistant Examiner* — Dana F Artimez
(74) *Attorney, Agent, or Firm* — McCoy Russell LLP (57) ABSTRACT

The disclosure relates to a method and system for providing visual guidance to a driver of a vehicle. The method comprises detecting, by a plurality of sensors of the vehicle, sensor data representing a vehicle environment; dynamically displaying, by a display of the vehicle, a visual representation of the vehicle environment; overlaying the visual representation with one or more first visual elements representing a proposed trajectory of a maneuver of the vehicle within the vehicle environment.

19 Claims, 9 Drawing Sheets

(52) U.S. Cl.
CPC .......... *G01C 21/3697* (2013.01); *B60K 35/00* (2013.01); *B60K 35/28* (2024.01); *B60K 2360/161* (2024.01); *B60K 2360/166* (2024.01)

(58) Field of Classification Search
CPC .. B62D 15/0275; B62D 15/028; G08G 1/165; G08G 1/168
See application file for complete search history.

(56) References Cited

U.S. PATENT DOCUMENTS

| | | | |
|---|---|---|---|
| 2006/0069478 A1* | 3/2006 | Iwama | B62D 15/028 701/1 |
| 2009/0091475 A1* | 4/2009 | Watanabe | G08G 1/168 701/41 |
| 2010/0070138 A1* | 3/2010 | Schoening | B62D 15/027 701/42 |
| 2012/0065877 A1 | 3/2012 | Jecker et al. | |
| 2013/0162829 A1* | 6/2013 | Kadowaki | B60R 1/27 348/148 |
| 2018/0265130 A1 | 9/2018 | Derendarz et al. | |
| 2019/0256144 A1* | 8/2019 | Yamada | B62D 15/0285 |
| 2020/0001923 A1* | 1/2020 | Kamiyama | B60R 1/00 |
| 2020/0079359 A1 | 3/2020 | Tsujino et al. | |
| 2020/0307616 A1 | 10/2020 | Nithiyanantham et al. | |
| 2022/0161850 A1* | 5/2022 | Yu | B60R 11/04 |
| 2022/0326039 A1* | 10/2022 | Takanohashi | G08G 1/143 |

FOREIGN PATENT DOCUMENTS

| | | | | |
|---|---|---|---|---|
| JP | 2010186257 A | * | 8/2010 | ......... B62D 15/0285 |
| WO | 2012045323 A1 | | 4/2012 | |

OTHER PUBLICATIONS

JP2010186257A_English (Year: 2010).*
European Patent Office, Extended European Search Report Issued in Application No. 21191649.9, Jan. 25, 2022, Germany, 12 pages.
European Patent Office, Office Action Issued in Application No. 21191649,9, Oct. 4, 2023, Netherlands, 6 pages.
European Patent Office, Office Action Issued in Application No. 21191649.9, Jun. 27, 2024, Netherlands, 6 pages.

* cited by examiner

VISUAL GUIDANCE SYSTEM FOR PARKING ASSISTANCE

CROSS-REFERENCE TO RELATED APPLICATION

The present application claims priority to European Patent Application No. 21191649.9, entitled "VISUAL GUIDANCE SYSTEM FOR PARKING ASSISTANCE," and filed on Aug. 17, 2021. The entirety of the above-listed application is hereby incorporated by reference for all purposes.

FIELD

The present disclosure relates to the field of connected vehicles. In particular, a visual guidance system to be used in connection with surround view systems for driving assistance is disclosed.

BACKGROUND

Guidance systems in vehicles, such as parking assistant systems in cars, are widely used.

They assist the driver of a vehicle during vehicle maneuvers in situations where the driver has limited visibility, for example while performing parallel/perpendicular parking maneuvers. Current guidance systems, however, provide limited information to the driver of a vehicle. For example, many systems present auditory warnings if the distance between the vehicle and an object is small or they show a static sketch of the vehicle and provide color-coded warnings if the distance between the vehicle and an object is small.

The present disclosure provides a method and system for an improved visual guidance system for vehicle maneuvers such as parking maneuvers. In particular, the method and system provide visual guidance for a safer and more efficient execution of a vehicle maneuver.

SUMMARY

According to one of many embodiments, there is provided a method for providing visual guidance to a driver of a vehicle. The method comprises: detecting, by a plurality of sensors of the vehicle, sensor data representing a vehicle environment; dynamically displaying, by a display of the vehicle, a visual representation of the vehicle environment; and overlaying the visual representation with one or more first visual elements representing a proposed trajectory of a maneuver of the vehicle within the vehicle environment.

The method may comprise displaying visual representations such as top view images or live views of the vehicle environment and displaying a proposed vehicle trajectory for the maneuver. Thereby, the driver has an overview of the situation including actual information about the nature of the objects in the vicinity of the vehicle and is provided with an intuitive suggestion of a proposed vehicle path to reach an end position of a maneuver, for example a path into a parking slot.

In other words: The objective of the method is to provide means to display one or more visual elements indicative of a proposed trajectory of a vehicle maneuver, for example a parking maneuver of a car. To this end, the vehicle environment is detected. For example, a map may be created using data captured by all or a part of available sensors in the vehicle. Possible sensors may comprise ultrasonic sensors, cameras through computer vision (classical or neural network), LIDAR or laser scanners. An image or live view of the environment is displayed on a display of the vehicle. Based on this map, a proposed trajectory, for example an optimum trajectory of the maneuver may be calculated. This proposed trajectory is displayed as an overlay within the visual representation, i.e. image or live view, of the vehicle environment. Thereby, the method provides an improved visual guidance that allows for more efficient vehicle maneuvers. Moreover, the method attracts attention of the driver to potentially dangerous/interesting areas during execution of a driving maneuver, thereby achieving safer vehicle maneuvers. Further advantages of the method are, inter alia, its ease of use, interactivity and smart environment awareness.

According to an embodiment, the proposed trajectory comprises a current position of the vehicle and a final position of the maneuver. Moreover, the current, final and one or more intermediate positions may be connected by a line. In other words, the complete trajectory of the maneuver is shown rather than only parts of the trajectory. This gives the driver a better overview and allows for improved foresight.

According to an embodiment, the visual representation is a top view and/or a three-dimensional view of the vehicle within the vehicle environment. Thereby, a surround overview of the vehicle environment is provided. The top view/three-dimensional view may be created through stitching of several camera images, for example captured by cameras at the front, left, right, rear of the vehicle. Thereby, the vehicle environment can be displayed including information about real objects in the vicinity of the vehicle. For example, the visual representation may comprise information that the vehicle is neighbored by a wall on one side and grass on the other side. Thereby, the driver has an improved overview of the vehicle surrounding and may adjust the vehicle maneuver in accordance. In other words: The method provides further enhanced visual guidance for efficiently executing a vehicle maneuver. The visual presentation may be an image or a live view. For example, changing conditions can be displayed at real time and the visual guidance may be adjusted accordingly.

According to an embodiment, objects of the displayed vehicle environment external to the vehicle remain static within the displayed visual representation of the vehicle environment when updating the displayed visual representation during a movement of the vehicle. In other words, a birds-eyes view of the vehicle environment and the maneuver is provided. This enables a comprehensive overview of the maneuver situation allowing the driver to capture the environment easily and adjust the vehicle movement accordingly. In other words: The time spent by the driver looking at the displayed visual representation of the vehicle environment is reduced, thereby further enhancing the visual guidance for safely executing a vehicle maneuver.

According to an embodiment, the method further comprises overlaying, simultaneously with the first visual elements, the visual representation with one or more second visual elements to assist the driver in performing the maneuver. For example, the first visual element may represent the proposed trajectory and the one or more second visual elements may indicate the current position and currently anticipated trajectory of the vehicle. The second visual elements may include indications of proposed amendments of the vehicle position to the driver. In other words: The method may provide an indication if and/or how the driver should adjust the vehicle movement. This enables a comprehensive overview of the maneuver to the driver and indicates directly if and/or how the driver should adjust the vehicle movement. Thereby, guidance for performing a-save safe and efficient vehicle maneuver is provided.

According to an embodiment, the one or more second visual elements are indicative of a current trajectory of the vehicle relative to the proposed trajectory. For example, the deviation of the current vehicle position to the proposed vehicle position may be displayed. The current trajectory may be determined based on the current vehicle position and a predicted vehicle trajectory based on the preceding movement and/or the current position of the wheels of the vehicle. The current trajectory may be implemented to a determined map of the vehicle environment and therein compared to the proposed trajectory. The second visual elements may indicate if there is a deviation between these trajectories and may additionally or alternatively indicate how the driver should adjust the current vehicle trajectory. This has the advantage that the driver perceives direct information and suggestions, thereby a safer, faster and more efficient guidance is provided for the vehicle maneuver.

According to an embodiment, the one or more second visual elements indicate if and/or how the driver shall change the current trajectory, in particular, the direction of the vehicle. The second visual elements may indicate if there is a deviation between these trajectories and may additionally or alternatively indicate how the driver should adjust the current vehicle trajectory. In particular, the second visual element may indicate if and/or how the driver should adjust the direction of the vehicle movement. For example, the second visual element may indicate that the driver should adjust the vehicle movement to the left or to the right. This has the advantage that the driver perceives direct information and suggestions for a safer, faster and more efficient vehicle maneuver. In other words, the visual guidance is further improved.

According to an embodiment, the one or more second visual elements indicate if and/or how the driver shall increase or decrease the velocity of the vehicle. The second visual elements may indicate if and additionally or alternatively how the driver should adjust the velocity of the current vehicle movement. For example, a visual element is displayed indicating that a certain maximum velocity is proposed for at least parts of the maneuver, such as narrow curves or areas between neighboring cars. This has the advantage that the driver perceives direct information and suggestions for a safer, faster and more efficient vehicle maneuver. In other words: Visual guidance for a safe maneuver is improved.

According to an embodiment, the one or more second visual elements indicate if and/or how the driver shall change the gear of the vehicle. The second visual elements may indicate if there is a deviation between the proposed and the current vehicle gear and may additionally or alternatively indicate how the driver should adjust the current vehicle trajectory. In particular, the second visual element may indicate if and/or how the driver should adjust the gear of the vehicle movement. For example, the second visual element may indicate that the driver should adjust the vehicle movement backwards or forward. This has the advantage that the method for providing visual guidance is further improved. In particular, the driver perceives direct and comprehensive information and suggestions for a safer, faster and more efficient vehicle maneuver.

According to an embodiment, the method further comprises: displaying a driver interface for selecting at least one of a plurality of predetermined maneuvers within the displayed environment; determining, based on a driver input, the maneuver of the plurality of predetermined maneuvers; determining the proposed trajectory of the maneuver.

The plurality of predetermined maneuvers may be determined based on the sensor data and/or a map representing the vehicle environment, the map being created based on the sensor data. The driver is presented with the possible maneuvers. The display may comprise an indication of one preferred maneuver, for example one optimum maneuver. For example, the plurality of predetermined maneuver may comprise several parking maneuvers for several parking slots in the vehicle environment. The display may comprise a prompt for the driver to select one maneuver. Thereby, the driver may choose a maneuver s/he prefers, for example the quickest or easiest maneuver. Based on the selection of the driver, the proposed trajectory for the chosen maneuver is calculated. Thereby, only the anticipated maneuver trajectory is calculated, which saves calculation time, resources and power consumption.

According to an embodiment, the method further comprises: determining the maneuver, in particular a parking maneuver, based on the detected vehicle environment and/or a user input; determining, in response to the determination of the maneuver, the proposed trajectory of the maneuver based on the detected vehicle environment; displaying the first visual element representing the proposed vehicle trajectory, in particular wherein the first visual element indicates a deviation of the current vehicle motion from the proposed trajectory.

After determining the maneuver, for example a parking maneuver into a certain parking slot, based on the vehicle environment and/or the driver's selection, the proposed trajectory for this maneuver is calculated and displayed. A second proposed trajectory may thus be displayed based on a subsequently detected vehicle environment, i.e. subsequently detected sensor data, and/or a subsequently received user input. The displaying comprises the proposed trajectory and may comprise in particular an indication of a deviation between the current vehicle movement and the proposed movement according to the proposed trajectory. This improves the overview of the driver during maneuver, for example during the parking maneuver.

According to an embodiment, the first or second visual element is indicative of an accumulated driver performance. Thereby, the visual guidance may be tailored to the driver of the car. The accumulated driver performance may be determined by storing information about the deviations between the proposed trajectories and the actually travelled trajectories during several vehicle maneuvers. This allows creating an individual profile of each driver of the vehicle. Based on such a profile, the second visual element may indicate proposed changes to the current vehicle movement during a current vehicle maneuvers based on the previous performance of the driver. For example, if the driver needed many adjustments during previous maneuvers, the second visual elements may comprise more or more detailed indications for vehicle movement adjustments than in a scenario where the driver needed fewer adjustments during previous maneuvers. This allows for a user-dependent individualized guidance.

According to an embodiment, the method further comprises: determining a travelled trajectory of the vehicle for one or more maneuvers performed by the vehicle; comparing the travelled trajectory of the vehicle to the proposed trajectory of the respective maneuver; determining one or more scores based on the comparison of the trajectories; storing the one or more scores; and determining the or an accumulated driver performance based on the one or more scores of the one or more maneuvers.

The method may comprises determining the actually travelled trajectory of the vehicle of one or several maneuvers and compares each of these travelled trajectories with the corresponding proposed trajectories. Based on the comparison, each maneuver may be labeled with a score. For example, if the deviation between the travelled and proposed trajectory is small, the maneuver may be labeled with a good score and if the deviation between the travelled and proposed trajectory is large, the maneuver may be labeled with a poor score. The scores are stored and an accumulated driver performance is determined based on the scores. For example, the accumulated driver performance may be an average of the scores. Thereby, a history of the driver performance may be stored and for example, improvements of the driver may by tracked and output. Also, the accumulated driver performance may be used during future vehicle maneuvers performed by the driver, i.e. more or less guidance may be provided if the accumulated driver performance is poor or good, respectively. Further, different driver profiles may be created for different drivers of the vehicle, thereby customizing the driver experience and increasing the efficiency and/or safety of the visual guidance.

According to an embodiment, the method further comprises: generating one or more warnings if the speed of the vehicle is above a first predetermined threshold speed; deactivating the display of the proposed trajectories if the speed of the vehicle is above a second predetermined threshold speed for at least a predetermined duration; and/or deactivating the display of the proposed trajectories if the speed of the vehicle is above a third predetermined threshold speed, wherein the third predetermined threshold speed is larger than the first predetermined threshold speed.

Warnings may be displayed if the vehicle speed is above a predetermined speed. Thereby, the safety of the maneuver is improved. Further, the displaying of the vehicle environment and/or first and/or second visual elements may be deactivated automatically e.g. if the vehicle speed is above a predetermined speed for a predetermined time period or above a predetermined higher speed. This enables automated deactivation of the visual guidance for instance if the driver behavior, i.e. current vehicle movement, indicates that the maneuver is cancelled by the driver. In other words: Distraction of the driver is reduced, in particular in situations that require increased attention.

According to an embodiment, the method further comprises: generating one or more warnings if the positional deviation of the vehicle to the proposed trajectory is above a first predetermined threshold deviation; deactivating the display of the proposed trajectories if the positional deviation of the vehicle is above a second predetermined threshold deviation for at least a predetermined duration; and/or updating the one or more first visual elements if the positional deviation of the vehicle is above a third predetermined threshold deviation, where in the third predetermined threshold deviation is larger than the first predetermined threshold deviation.

Warnings may be displayed if the vehicle position is above a predetermined deviation from the proposed trajectory. Thereby, the safety and efficiency of the maneuver are improved. Further, the displaying of the vehicle environment and/or first and/or second visual elements may be deactivated automatically if the positional deviation of the vehicle from the proposed trajectory is above a predetermined deviation for a predetermined time period. This enables automated deactivation of the visual guidance for instance if the driver behavior, i.e. current vehicle movement, indicates that the maneuver is cancelled by the driver. Alternatively or additionally, the first visual elements may be updated if the positional deviation of the vehicle from the proposed trajectory is above a predetermined large deviation. For example, a new proposed trajectory may be calculated and displayed based on the new current vehicle position. This allows for an efficient, dynamic adjustment of the vehicle maneuver.

A second aspect of the disclosure relates to another method for providing visual guidance to a driver of a vehicle. The method comprising: detecting, by a plurality of sensors of the vehicle, sensor data representing a vehicle environment; dynamically displaying, by a display of the vehicle, a visual representation of the vehicle environment; detecting one or more objects, by the plurality of sensors of the vehicle, in the vicinity of the vehicle; and displaying one or more visual elements if the distance between the vehicle and the detected one or more objects is below a predetermined threshold distance, wherein the one or more visual elements comprise camera views of the one or more objects and/or indicate the distance to the one or more objects.

The method may thus provide means to display several visual elements indicative of objects within the vicinity of a vehicle during a vehicle maneuver, for example a parking maneuver of a car. To this end, the vehicle environment is detected. For example, a map may be created using data captured by all or a part of available sensors in the vehicle. Possible sensors may comprise ultrasonic sensors, cameras through computer vision (classical or neural network), LIDAR or laser scanners. An image or live view of the environment is displayed on a display of the vehicle. Based on this map, distances between external objects and the vehicle may be calculated. Visual elements are displayed within the visual representation, i.e. image or live view, of the vehicle environment, if the distance between one or more objects and the vehicle is below a predetermined threshold distance. Thereby, the method enables safe vehicle maneuvers and attracts attention of the driver to potentially dangerous/interesting areas during execution of a driving maneuver. In particular, the visual elements comprise camera views of the one or more objects within the below-threshold distance to the vehicle. For example, the visual elements may include zoom-ins of the region of interest and marked distances between vehicle and object. This allows the driver to decide on her/his actions based on the nature of the object. For example, the driver may adjust the vehicle movement differently if the object is another car or if the object is grass. In other words: The method provides a more comprehensive visual guidance to the driver. Alternatively or additionally, the visual elements may indicate the distance to the one or more objects. The distances may be measured using one or more of ultrasonic sensors, cameras through computer vision (classical or neural network), LIDAR or laser scanners. This allows the driver to decide for example on the magnitude of the changes of the vehicle movement or the vehicle speed. Advantages of the method are its ease of use, interactivity and smart environment awareness. Warnings of possible collisions further improve the safety of the vehicle maneuver.

A third aspect of the disclosure relates to a system for providing visual guidance to a driver of a vehicle. The system comprises one or more sensors; one or more displays; and a computing device. The system is configured to execute the above method. All properties and/or advantages of the method of the present disclosure also apply to the system mutandis mutatis.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1A:
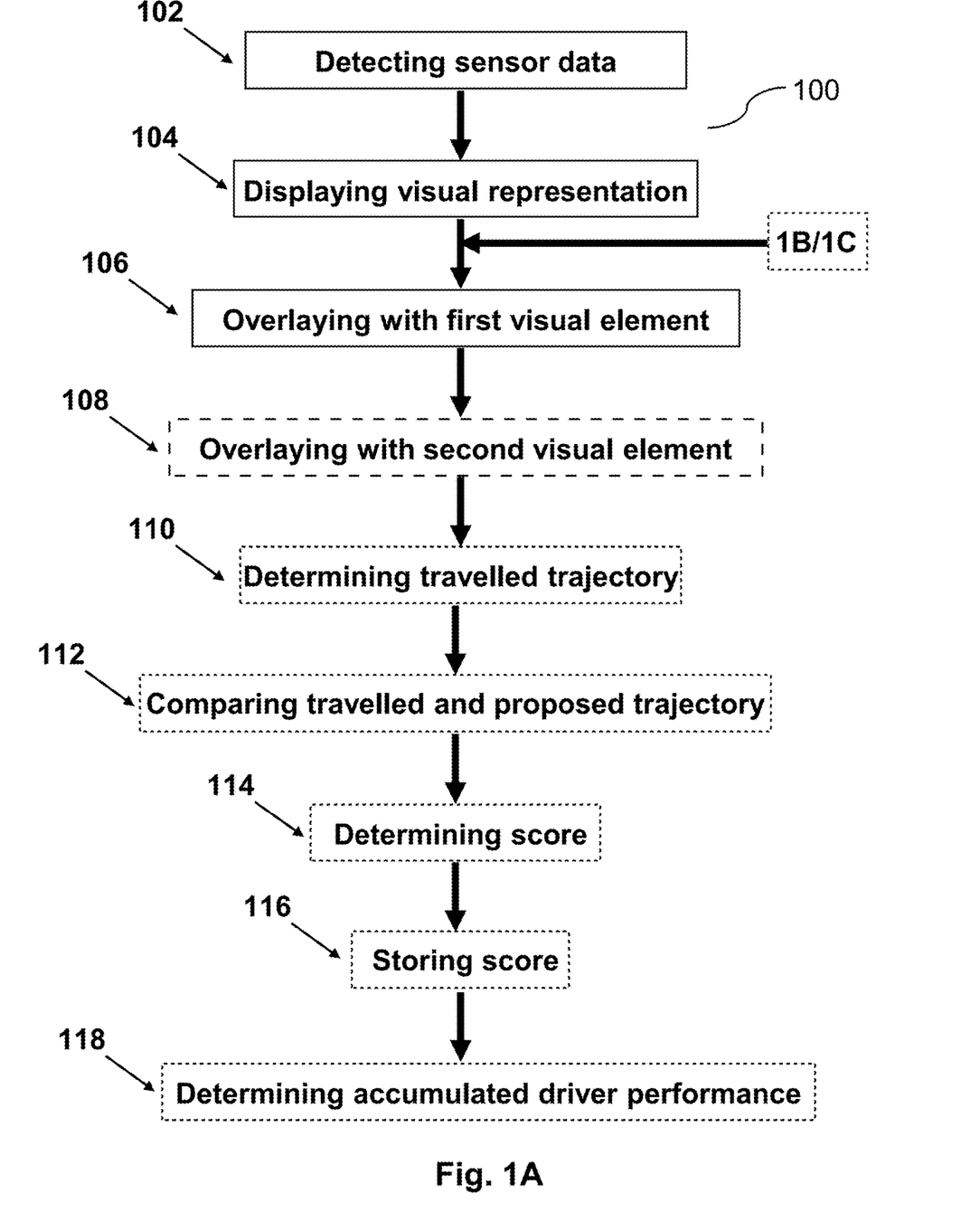
FIG. 1A depicts a flow chart of a first method for providing visual guidance to a driver of a vehicle.

FIG. 1 shows a flow chart of a method 100 for providing visual guidance to a driver of a vehicle. In step 102, sensor data are detected by a plurality of sensors of the vehicle. The sensor data are representative of a vehicle environment. For example, a map may be created using data captured by all or a part of available sensors in the vehicle. Possible sensors may comprise ultrasonic sensors, cameras through computer vision (classical or neural network), LIDAR or laser scanners. The vehicle environment may comprise the vehicle itself.

Figure 2:
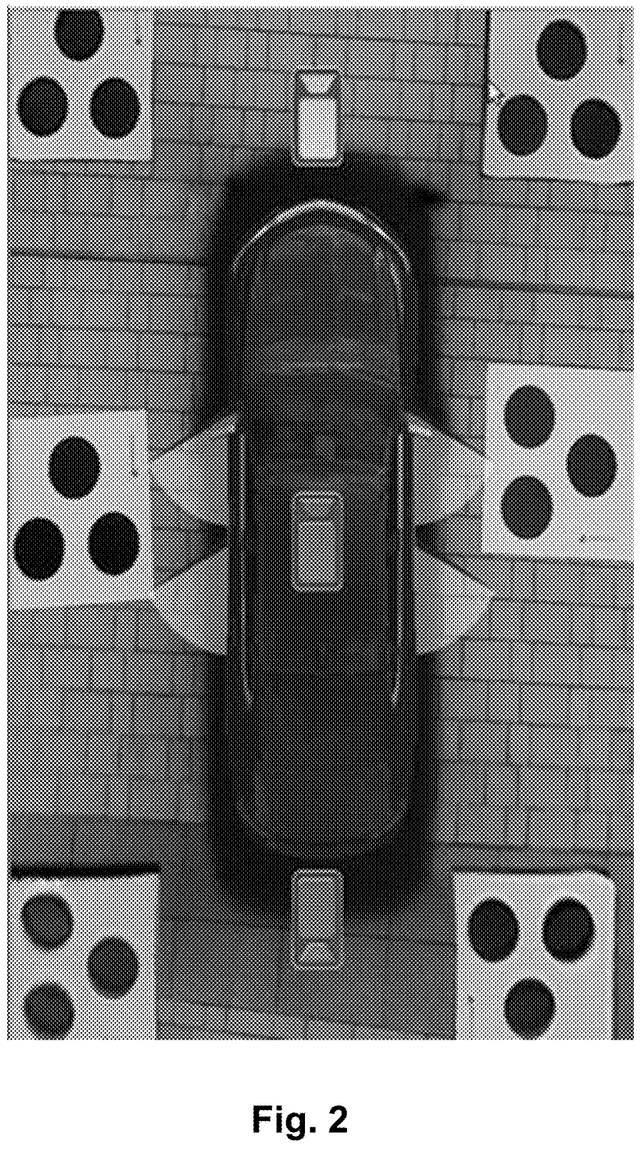
FIG. 2 depicts a live top view of a vehicle in a vehicle environment.

In step 104, a visual representation of the vehicle environment is dynamically displayed by a display of the vehicle. The visual representation is based on the sensor data. In a preferred embodiment, the visual representation is a top view and/or a three-dimensional view of the vehicle within the vehicle environment. Thereby, a surround overview of the vehicle environment is provided. The top view/three-dimensional view may be created through stitching of several camera images, for example captured by cameras at the front, left, right, rear of the vehicle. FIG. 2 depicts such an exemplary top view of a vehicle in a vehicle environment. In a preferred embodiment, the vehicle environment may be displayed including information about real objects in the vicinity of the vehicle. For example, the visual representation may comprise information that the vehicle is neighbored by a wall on one side and grass on the other side. The visual presentation may be an image or a live view. For example, changing conditions can be displayed at real time and the visual guidance may be adjusted accordingly. The visual representation of the vehicle environment may comprise respective visual representation of the vehicle and of objects external to the vehicle, such as other vehicles. According to an embodiment, objects of the displayed vehicle environment external to the vehicle remain static within the displayed visual representation of the vehicle environment when updating the displayed visual representation during a movement of the vehicle. In other words, a birds-eyes view of the vehicle environment and the maneuver is provided. Put in yet another way, a movement of the vehicle is shown within the displayed visual representation of the vehicle environment by changing the position of a visual representation of the vehicle within the environment rather than by changing the position of a visual representation of an object external to the vehicle.

Returning to step 106 of FIG. 1, the visual representation is overlaid with one or more first visual elements representing a proposed trajectory of a maneuver of the vehicle within the vehicle environment. The proposed trajectory may be calculated based on the detected and/or calculated map of the vehicle environment. In an embodiment, the proposed trajectory may be an optimum trajectory of the maneuver. According to a preferred embodiment, the proposed trajectory comprises a current position of the vehicle, representing for example a starting position of the maneuver, and a final position of the maneuver. In other words, the complete trajectory of the maneuvers is shown rather than parts of the trajectory.

According to a preferred embodiment, in step 108, the visual representation is overlaid, simultaneously with the first visual elements, with one or more second visual elements to assist the driver in performing the maneuver. For example, in a preferred embodiment, the first visual element may represent the proposed trajectory and the one or more second visual elements may indicate the current position and/or the currently anticipated trajectory of the vehicle. The second visual elements may include indications of proposed amendments of the vehicle position and/or trajectory to the driver, for example if and/or how the driver should adjust the vehicle movement. According to an embodiment, the one or more second visual elements are indicative of a current trajectory of the vehicle relative to the proposed trajectory.

Figure 3:
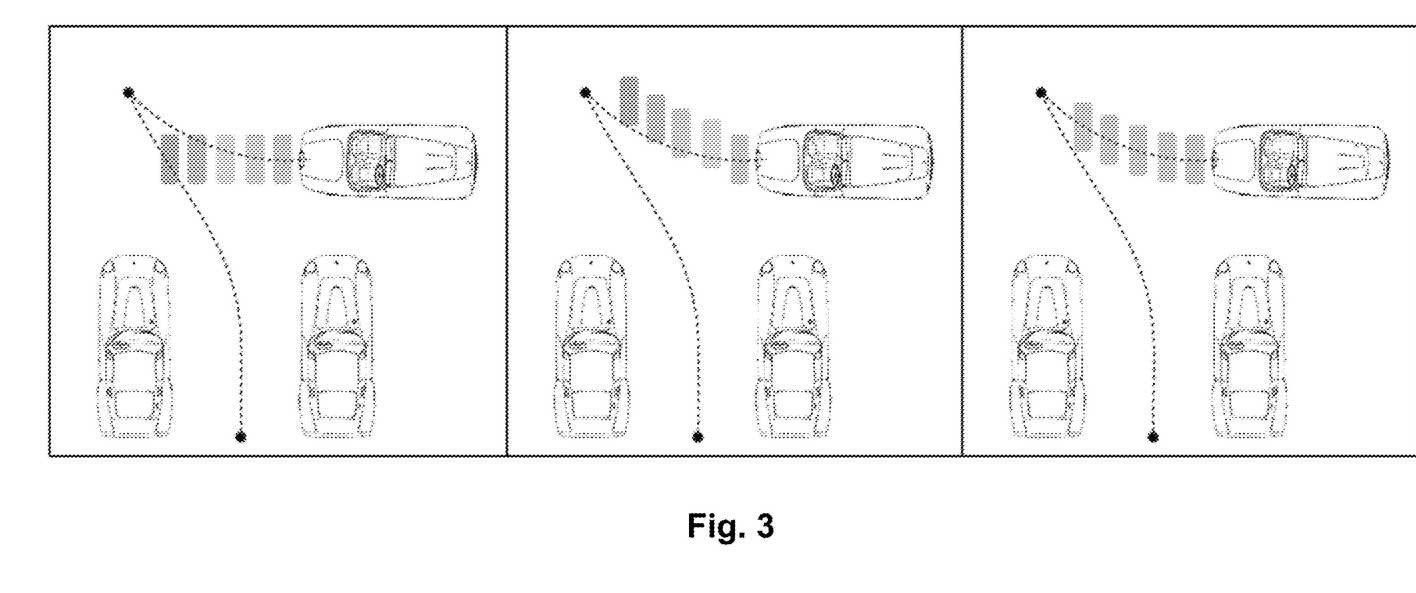
FIG. 3 depicts an example of displayed first and second visual elements indicating that the driver shall adjust the direction of the vehicle.

FIG. 3 depicts an example of first and second visual elements indicating that the driver shall adjust the direction of the vehicle. In FIG. 3, the first visual element is a dotted line, which represents the proposed trajectory. The shaded (or colored) queues are the second visual elements, which represent the deviation of the current vehicle position to the proposed vehicle. The current trajectory may be determined based on the current vehicle position and a predicted vehicle trajectory based on the preceding movement and/or the current position of the wheels of the vehicle. The current trajectory may be implemented to the detected map of the vehicle environment and therein compared to the proposed trajectory. The second visual elements may indicate if there is a deviation between these trajectories and may additionally or alternatively indicate how the driver should adjust the current vehicle trajectory. For example, the shade (or color) of the queues indicates the magnitude of the suggested changes of the movement of the vehicle. For example, the position of the second visual element may indicate that the driver should adjust the vehicle movement to the left or to the right.

Figure 4:
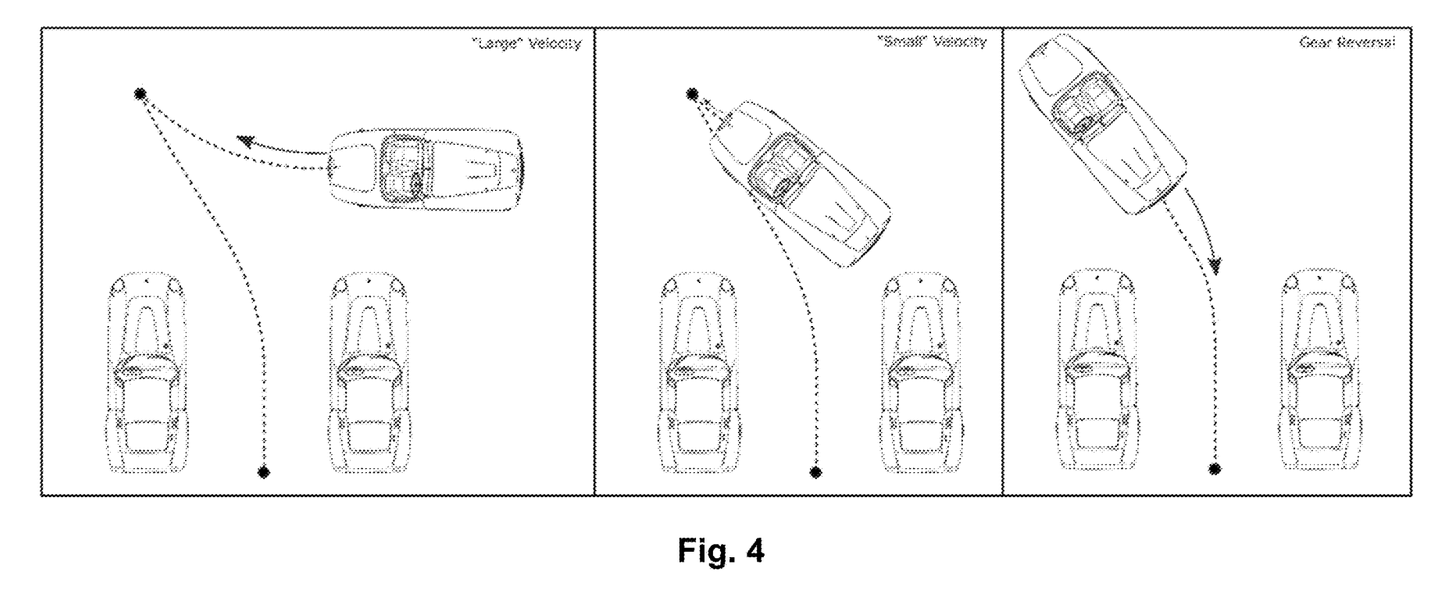
FIG. 4 depicts an example of displayed first and second visual elements indicating that the driver shall adjust the velocity and gear of the vehicle.

FIG. 4 depicts an example of first and second visual elements indicating that the driver shall adjust the velocity and gear of the vehicle. In FIG. 4, the first visual element is a dotted line representing the proposed trajectory. The second visual element is an arrow. The length of the arrow indicates the gap between the current speed and a proposed speed, in other words the magnitude of the suggested changes of the motion of the vehicle. The direction of the arrow indicates the direction of the proposed vehicle motion, for example forward or backwards.

According to an embodiment, the first or second visual element is indicative of an accumulated driver performance. Thereby, the visual guidance may be tailored to the driver of the car by creating an individual profile of each driver of the vehicle. Based on such a profile, the second visual element may indicate proposed changes to the current vehicle movement during a current vehicle maneuvers based on the previous performance of the driver. For example, if the driver needed many adjustments during previous maneuvers, the second visual elements may comprise more detailed indications for vehicle movement adjustments than in a scenario where the driver needed fewer adjustments during previous maneuvers.

Therefore, according to an embodiment, in step 110, a travelled trajectory of the vehicle for one or more maneuvers performed by the vehicle is determined. In step 112, the travelled trajectory is compared to the proposed trajectory of the respective maneuver. Based on this comparison, one or more scores are determined in step 114 and stored in step 116. For example, if the deviation between the travelled and proposed trajectory is small, the maneuver may be labeled with a good score and if the deviation between the travelled and proposed trajectory is large, the maneuver may be labeled with a poor score. In step 118, an accumulated driver performance based on the one or more scores of the one or more maneuvers is determined. For example, the accumulated driver performance may be an average of the scores. The accumulated driver performance may be used during future vehicle maneuvers performed by the driver, i.e. more or less guidance may be provided if the accumulated driver performance is poor or good, respectively. The accumulated driver performance may be displayed.

Figure 1B:
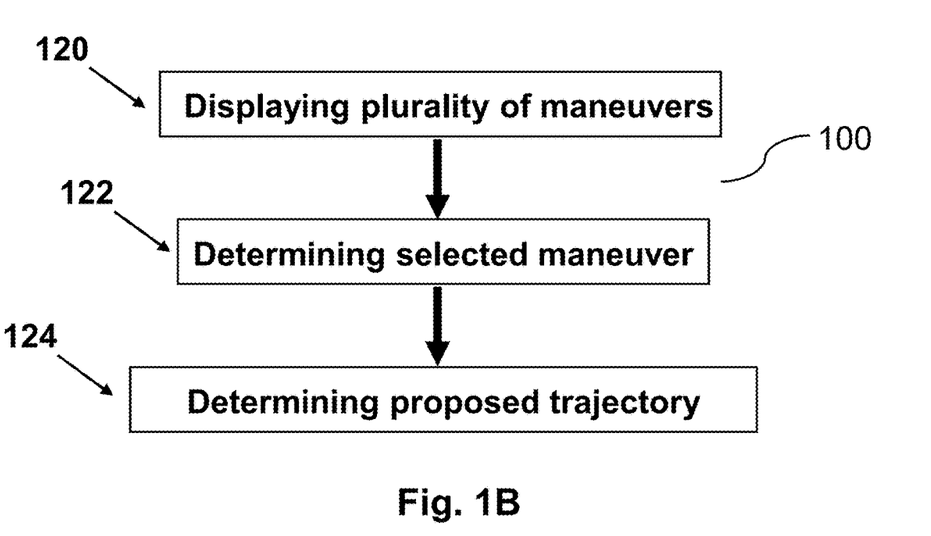
FIGS. 1B-1C depict a respective flow chart of further optional steps of the method for providing visual guidance to a driver of a vehicle.

FIG. 1B shows an embodiment of the method, wherein, prior to overlaying the visual representation of the vehicle environment with a proposed trajectory of the maneuver, a driver interface for selecting at least one of a plurality of predetermined maneuvers within the displayed environment is displayed in step 120. The plurality of predetermined maneuvers may be determined based on the sensor data and/or a map representing the vehicle environment, the map being created based on the sensor data. The driver is presented with the possible maneuvers. The display may comprise an indication of one preferred maneuver, for example one optimum maneuver. For example, the plurality of predetermined maneuver may comprise several parking maneuvers for several parking slots in the vehicle environment. The display may comprise a prompt for the driver to select one maneuver. Thereby, the driver may choose a maneuver s/he prefers, for example the quickest or easiest maneuver. Based on the driver's selection, the chosen maneuver of the plurality of predetermined maneuvers is determined in step 122 and the proposed trajectory of this maneuver is determined in step 124.

Figure 1C:
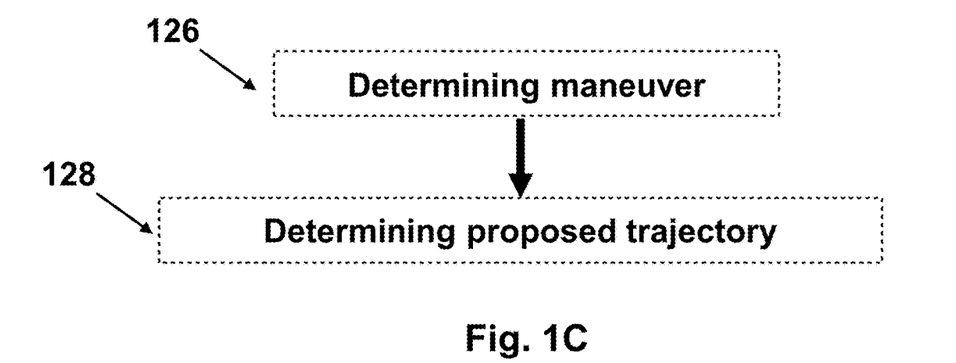

FIG. 1C shows an alternative embodiment of the method, wherein, prior to overlaying the visual representation of the vehicle environment with a proposed trajectory of the maneuver, in step 126, the maneuver based on the detected vehicle environment and/or a user input is determined. In a preferred embodiment, the maneuver is a parking maneuver. For example, a parking maneuver into a certain parking slot, based on the vehicle environment and/or the driver's selection, is determined. In step 128, the proposed trajectory of the maneuver is determined in response to the determination of the maneuver and based on the detected vehicle environment.

Figure 5A:
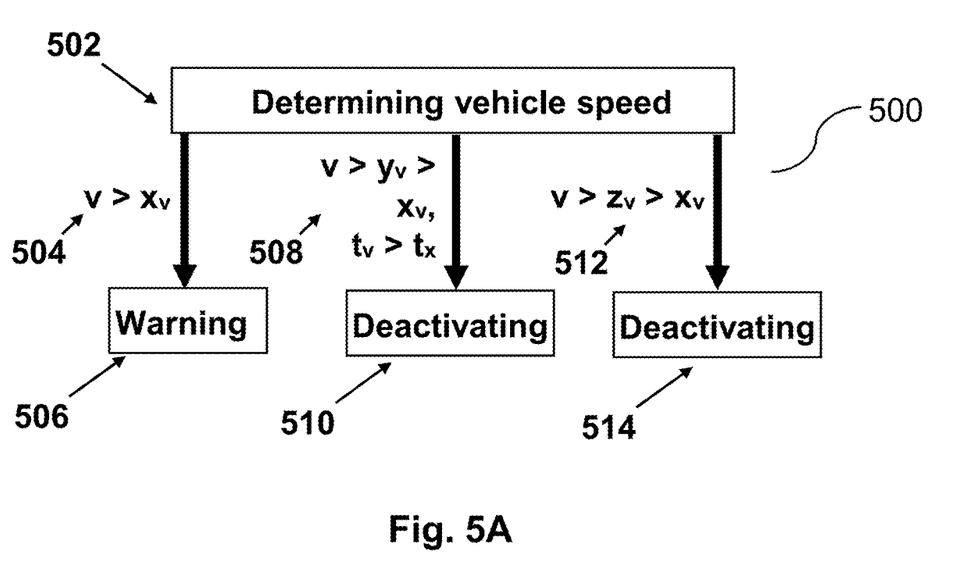
FIGS. 5A-5B depict a flow chart of a respective method for generating a warning or deactivating the display of visual guidance.
Figure 5B:
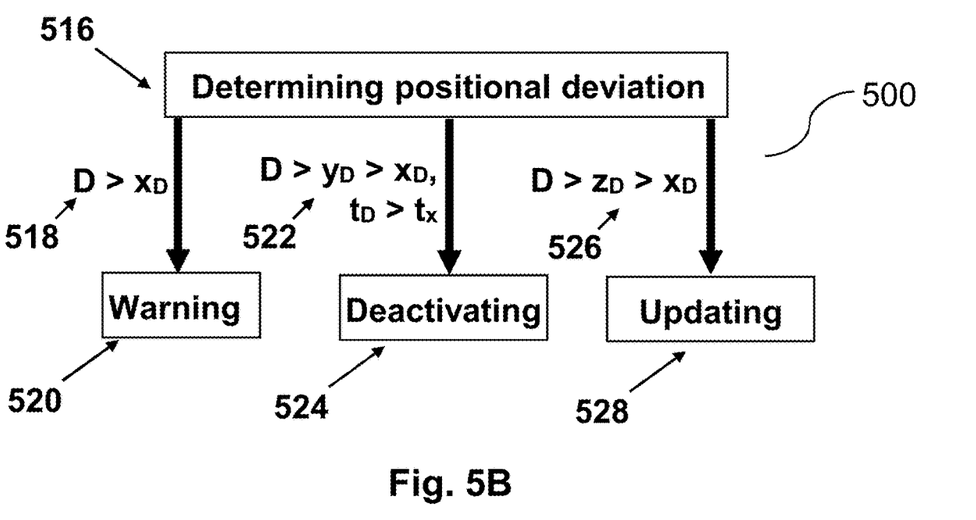

FIG. 5 depict flow charts of methods 500 for generating a warning or deactivating and/or updating the display of visual guidance. According to a preferred embodiment in FIG. 5A, the current vehicle speed during the maneuver is determined in step 502. If the speed of the vehicle is above a first predetermined threshold speed (step 504), one or more warnings are generated and displayed in step 506. If the speed of the vehicle is above a second predetermined threshold speed for at least a predetermined duration (step 508), the display of the proposed trajectory is deactivated in step 510. Additionally or alternatively, if the speed of the vehicle is above a third predetermined threshold speed larger than the first threshold speed (step 512), the display of the proposed trajectory is deactivated in step 514.

According to an embodiment in FIG. 5B, the current positional deviation between the vehicle position and the proposed position on the proposed trajectory are determined in step 516. If the positional deviation of the vehicle to the proposed trajectory is above a first predetermined threshold deviation (step 518), one or more warnings are generated and displayed in step 520. If the positional deviation of the vehicle is above a second predetermined threshold deviation for at least a predetermined duration (step 522), the display of the proposed trajectory is deactivated in step 524. Additionally or alternatively, if the positional deviation of the vehicle is above a third predetermined threshold deviation larger than the first threshold deviation (step 526), the proposed trajectory is updated in step 528. For example, a new trajectory based on the new starting position is determined and displayed.

Figure 6:
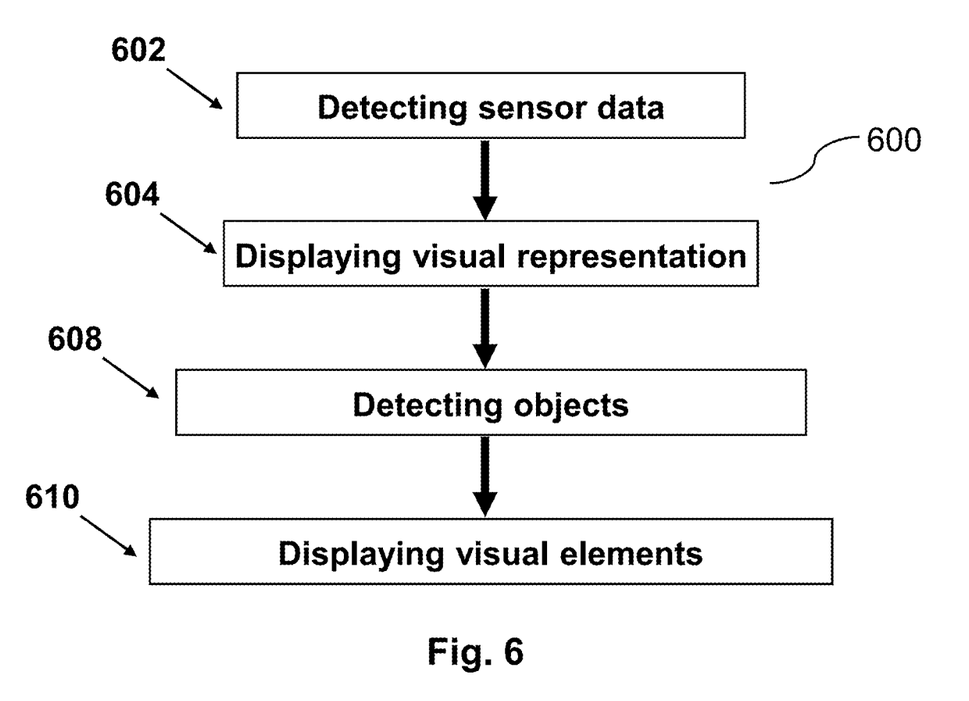
FIG. 6 depicts a flow chart of a second method for providing visual guidance to a driver of a vehicle according to another embodiment.
Figure 7:
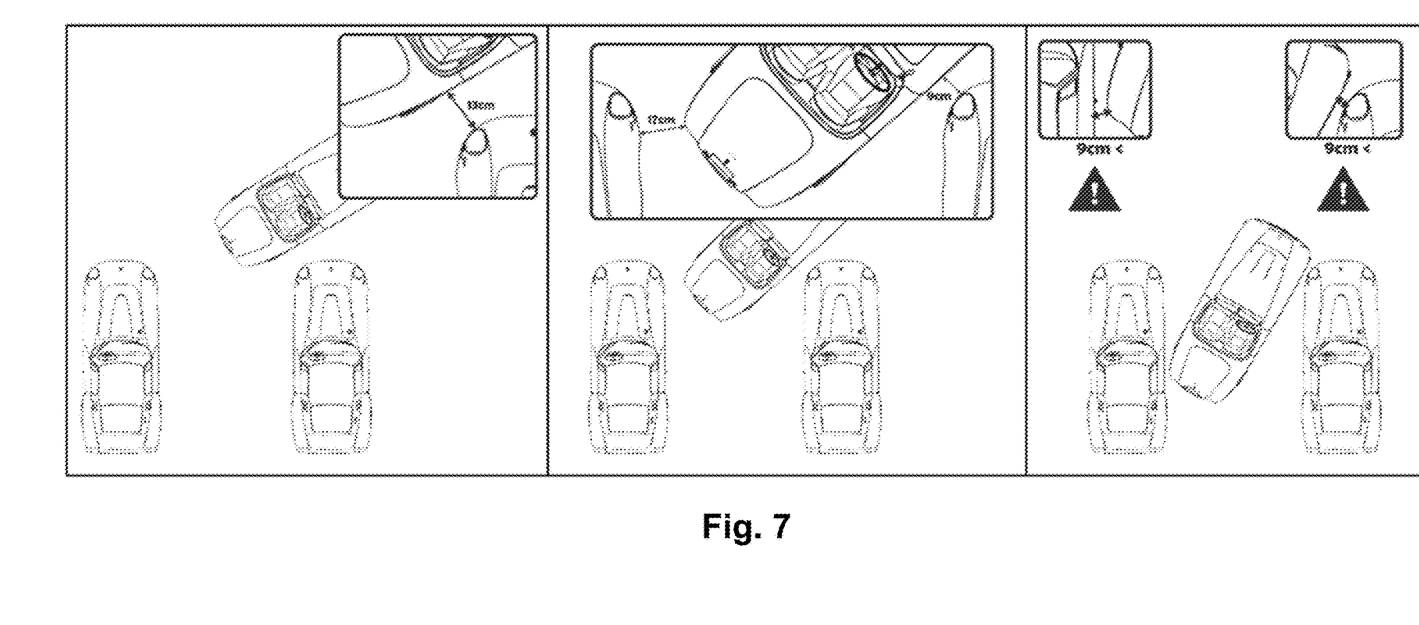
FIG. 7 depicts an example of displayed third visual elements.

FIG. 6 depicts a flow chart of a method 600 for providing visual guidance to a driver of a vehicle according to another embodiment. In step 602, sensor data representing a vehicle environment are detected by a plurality of sensors of the vehicle. Possible sensors may comprise ultrasonic sensors, cameras through computer vision (classical or neural network), LIDAR or laser scanners. In step 604, a visual representation of the vehicle environment is dynamically displayed by a display of the vehicle. For example, a map may be created using data captured by all or a part of available sensors in the vehicle. An image or live view of the environment is displayed on a display of the vehicle. In step 608, one or more objects in the vicinity of the vehicle are detected by the plurality of sensors of the vehicle. Based on the map of the vehicle environment, distances between the external objects and the vehicle may be calculated. In step 610, one or more visual elements are displayed, if the distance between the vehicle and the detected one or more objects is below a predetermined threshold distance. In a preferred embodiment, the one or more visual elements comprise camera views of the one or more objects and/or indicate the distance to the one or more objects. For example, the visual elements may include zoom-ins of the region of interest and marked distances between vehicle and object. FIG. 7 depicts an example of the visual guidance including third visual elements in the form of zoom-ins and marked distances.

Figure 8:
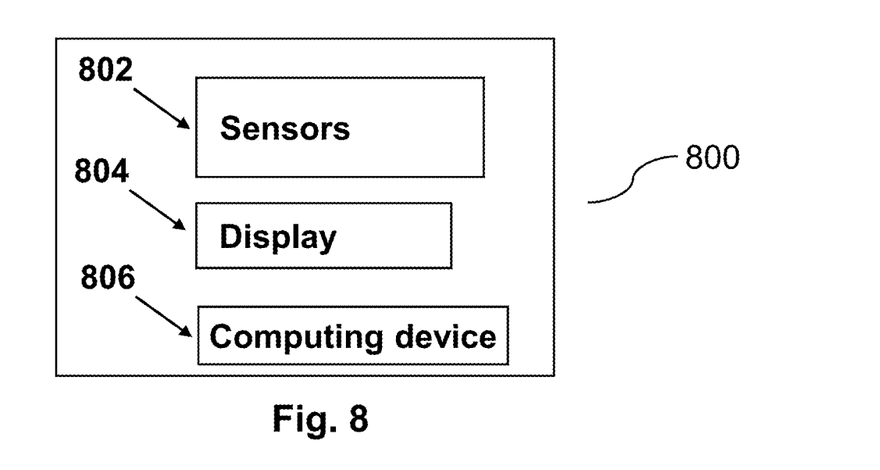
FIG. 8 depicts a block diagram of a system to provide visual guidance to a driver of a vehicle.

FIG. 8 depicts a block diagram of a system 800 to provide visual guidance to a driver of a vehicle. The system comprises one or more sensors 802; one or more displays 804; and a computing device 806. The system is configured to execute the above embodiments of the method. All properties of the method of the present disclosure also apply to the system. In a preferred embodiment, the sensors 802 comprise a surround view camera system. Possible further sensors 802 may comprise ultrasonic sensors, cameras through computer vision (classical or neural network), LIDAR or laser scanners. In a preferred embodiment, the one or more displays 804 are displays of the vehicle.

The invention claimed is:

1. A method for providing visual guidance to a driver of a vehicle, the method comprising:
   detecting, by a plurality of sensors of the vehicle positioned around the vehicle, sensor data representing a vehicle environment, wherein the plurality of sensors comprises ultrasonic sensors, cameras, LIDAR, or laser scanners;
   stitching together images from the plurality of sensors of the vehicle to create a visual representation of the vehicle environment;
   dynamically displaying, on a display of the vehicle that provides the driver with an improved overview of vehicle surroundings, the visual representation of the vehicle environment; and
   overlaying the visual representation of the vehicle environment on the display of the vehicle with one or more first visual elements representing a proposed trajectory of a maneuver of the vehicle within the vehicle environment; and
   overlaying, simultaneously with the first visual elements, second visual elements, wherein the second visual elements are based on an accumulated driver performance, wherein the accumulated driver performance is determined from stored deviations between proposed trajectories and actual trajectories for a plurality of prior maneuvers of the vehicle;
   wherein the visual representation of the vehicle environment includes at least one of: a top view of the vehicle within the vehicle environment, and a three-dimensional view of the vehicle within the vehicle environment, a movement of the vehicle being shown within the displayed visual representation of the vehicle environment by changing a position of a visual representation of the vehicle within the environment; and
   wherein a visual representation of one or more objects of the vehicle environment external to the vehicle remains static within the visual representation of the vehicle environment on the display of the vehicle when updating the visual representation of the vehicle environment on the display of the vehicle during the movement of the vehicle.

2. The method of claim 1, wherein the first visual element is a line and the second visual elements are shaded or colored queues representing a deviation between a current vehicle position and the proposed trajectory, wherein a shading or coloring of the shaded or colored queues indicates a magnitude of the deviation.

3. The method of claim 1, wherein the movement of the vehicle is shown within the displayed visual representation of the vehicle environment by changing the position of the visual representation of the vehicle within the environment, rather than by changing the position of the visual representation of the one or more objects of the vehicle environment external to the vehicle.

4. The method of claim 1, wherein the one or more second visual elements are indicative of a current trajectory of the vehicle relative to the proposed trajectory of the maneuver of the vehicle.

5. The method of claim 1, wherein the one or more second visual elements indicate at least one of: if the driver shall change a current trajectory of the vehicle; how the driver shall change the current trajectory of the vehicle; if the driver shall increase or decrease a velocity of the vehicle; how the driver shall increase or decrease the velocity of the vehicle; if the driver shall change a gear of the vehicle; and how the driver shall change the gear of the vehicle.

6. The method of claim 5, wherein the current trajectory includes a direction of the vehicle.

7. The method of claim 1, wherein the method further comprises:
   displaying a driver interface for selecting a maneuver of a plurality of predetermined maneuvers within the visual representation of the vehicle environment on the display of the vehicle, wherein each of the plurality of predetermined maneuvers corresponds to a respective parking slot;
   determining, based on a driver input, the maneuver of the plurality of predetermined maneuvers; and
   determining the proposed trajectory of the maneuver of the plurality of predetermined maneuvers.

8. The method of claim 1, wherein the method further comprises:
   determining the maneuver of the vehicle based on at least one of: the detected sensor data representing the vehicle environment; and a user input;
   determining, in response to the determination of the maneuver of the vehicle, the proposed trajectory of the maneuver of the vehicle based on the detected sensor data representing the vehicle environment;
   displaying the one or more first visual elements representing the proposed trajectory of the maneuver of the vehicle, wherein the one or more first visual elements indicate a deviation of a current vehicle motion from the proposed trajectory of the maneuver of the vehicle; and
   displaying the one or more first visual elements representing the proposed trajectory of the maneuver of the vehicle.

9. The method of claim 8, wherein the maneuver is a parking maneuver.

10. The method of claim 1, wherein the method further comprises:
    determining a travelled trajectory of the vehicle for one or more maneuvers performed by the vehicle;
    comparing the travelled trajectory of the vehicle to the proposed trajectory of the maneuver of the vehicle;
    determining one or more scores based on the comparison of the travelled trajectory of the vehicle to the proposed trajectory of the maneuver of the vehicle;
    storing the one or more scores; and
    determining an accumulated driver performance based on the one or more scores.

11. The method of claim 1, wherein the method further comprises:
    operating with a speed of the vehicle being above a first predetermined threshold speed;
    generating one or more warnings based on a determination that the speed of the vehicle is above the first predetermined threshold speed;
    operating with the speed of the vehicle being above a second predetermined threshold speed for at least a predetermined duration;
    deactivating the display of the proposed trajectory of the maneuver of the vehicle based on a determination that the speed of the vehicle is above the second predetermined threshold speed for at least the predetermined duration;
    operating with the speed of the vehicle being above a third predetermined threshold speed, wherein the third predetermined threshold speed is larger than the first predetermined threshold speed; and deactivating the display of the proposed trajectory of the maneuver of the vehicle based on a determination that the speed of the vehicle is above the third predetermined threshold speed.

12. The method of claim 1, wherein the method further comprises:
  operating with a positional deviation of the vehicle with respect to the proposed trajectory of the maneuver of the vehicle being above a first predetermined threshold deviation;
  generating one or more warnings based on a determination that the positional deviation of the vehicle with respect to the proposed trajectory of the maneuver of the vehicle is above the first predetermined threshold deviation;
  operating with the positional deviation of the vehicle being above a second predetermined threshold deviation for at least a predetermined duration;
  deactivating the display of the proposed trajectory of the maneuver of the vehicle based on a determination that the positional deviation of the vehicle is above the second predetermined threshold deviation for at least the predetermined duration;
  operating with the positional deviation of the vehicle being above a third predetermined threshold deviation, wherein the third predetermined threshold deviation is larger than the first predetermined threshold deviation; and
  updating the one or more first visual elements representing the proposed trajectory of the maneuver of the vehicle based on a determination that the positional deviation of the vehicle is above the third predetermined threshold deviation.

13. The method of claim 1, wherein stitching together images from the plurality of sensors of the vehicle to create the visual representation of the vehicle environment comprises stitching camera images from a first camera positioned at a front of the vehicle, a second camera positioned at a left side of the vehicle, a third camera positioned at a right side of the vehicle, and a fourth camera positioned at a rear of the vehicle.

14. The method of claim 1, further comprising creating an individual profile of each driver of the vehicle, wherein the individual profile is based on the accumulated driver performance for each driver of the vehicle.

15. The method of claim 14, wherein, for a first driver who needed more adjustments during previous maneuvers than a second driver, the second visual elements comprise more or more detailed indications for vehicle movement adjustments than for a second driver who needed fewer adjustments during previous maneuvers.

16. The method of claim 1, wherein the first visual element is a line and the second visual elements are arrows, wherein the length of the arrow represents a magnitude of deviation between a current speed and a proposed speed, and wherein a direction of the arrow indicates a direction of the proposed trajectory as compared to a current location of the vehicle.

17. A method for providing visual guidance to a driver of a vehicle, the method comprising:
  detecting, by a plurality of sensors of the vehicle, sensor data representing a vehicle environment, wherein the plurality of sensors comprises ultrasonic sensors, cameras, LIDAR, or laser scanners;
  stitching together images from the plurality of sensors of the vehicle to create a visual representation of the vehicle environment;
  dynamically displaying, on a display of the vehicle, the visual representation of the vehicle environment;
  detecting one or more objects, by the plurality of sensors of the vehicle, in a vicinity of the vehicle;
  operating with a positional deviation of the vehicle with respect to a proposed trajectory of the maneuver of the vehicle being above an additional predetermined threshold deviation; and
  updating, on the display of the vehicle, the one or more visual elements representing the proposed trajectory of the maneuver of the vehicle based on a determination that the positional deviation of the vehicle with respect to the proposed trajectory of the maneuver of the vehicle is above the additional predetermined threshold deviation;
  wherein the proposed trajectory of the maneuver of the vehicle is based on an accumulated driver performance of the driver, wherein the accumulated driver performance is determined by storing information about deviations between proposed trajectories and actual trajectories for a plurality of previous vehicle maneuvers.

18. The method of claim 17, wherein the additional predetermined threshold deviation is a first additional predetermined threshold deviation, and wherein the method further comprises:
  operating with the positional deviation of the vehicle with respect to the proposed trajectory of the maneuver of the vehicle being above a second additional predetermined threshold deviation; and
  generating one or more warnings based on a determination that the positional deviation of the vehicle with respect to the proposed trajectory of the maneuver of the vehicle is above the second additional predetermined threshold deviation.

19. The method of claim 17, wherein the additional predetermined threshold deviation is a first additional predetermined threshold deviation, and wherein the method further comprises:
  operating with the positional deviation of the vehicle with respect to the proposed trajectory of the maneuver of the vehicle being above a third additional predetermined threshold deviation for at least a predetermined duration; and
  deactivating, on the display of the vehicle, the display of the proposed trajectory of the maneuver of the vehicle based on a determination that the positional deviation of the vehicle with respect to the proposed trajectory of the maneuver of the vehicle is above the third additional predetermined threshold deviation for at least the predetermined duration.

* * * * *